Dec. 16, 1930.  A. L. DUNCAN  1,785,004
FRUIT PITTING AND CORING APPARATUS
Original Filed Nov. 1, 1926   2 Sheets-Sheet 1
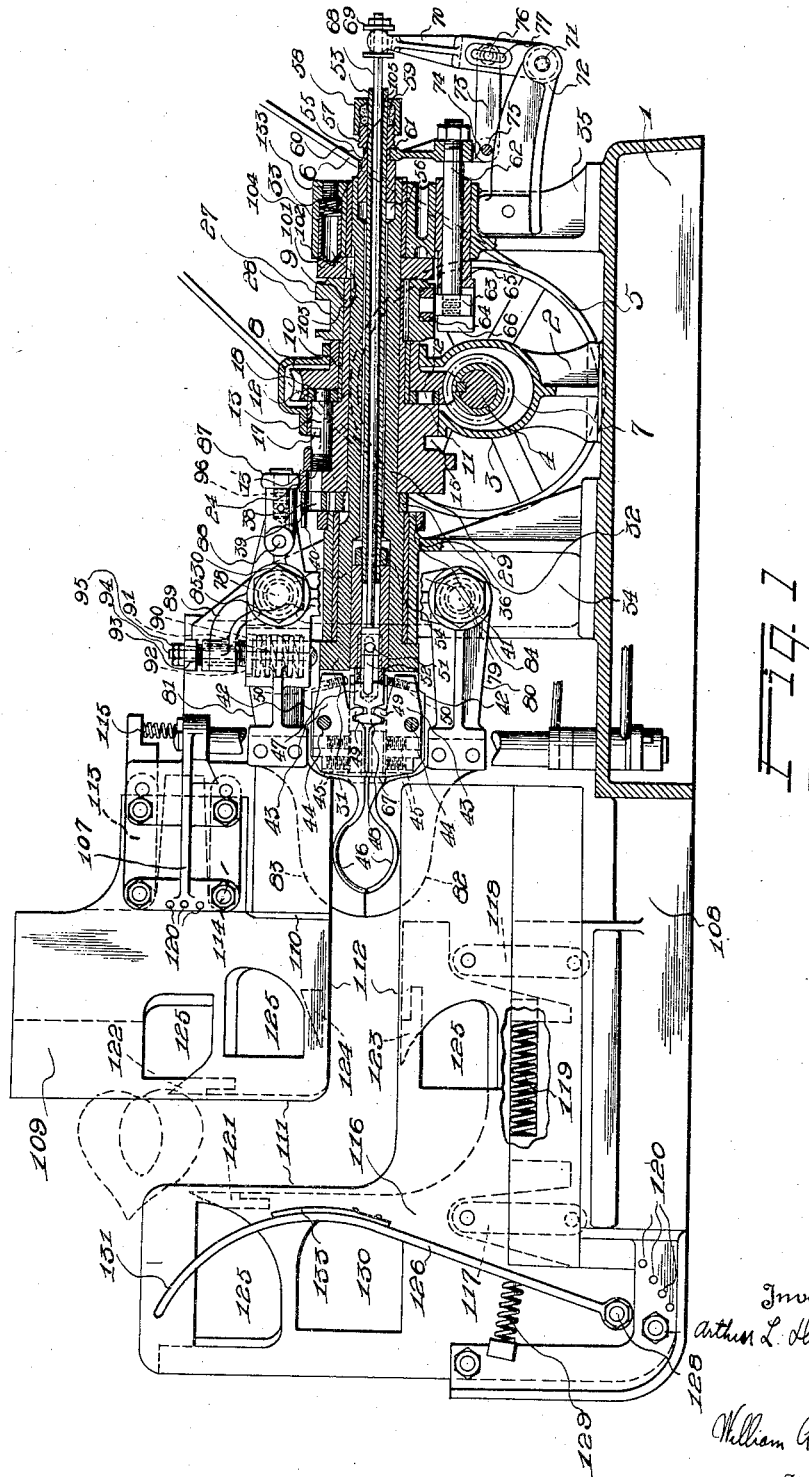

Dec. 16, 1930.  A. L. DUNCAN  1,785,004
FRUIT PITTING AND CORING APPARATUS
Original Filed Nov. 1, 1926  2 Sheets-Sheet 2
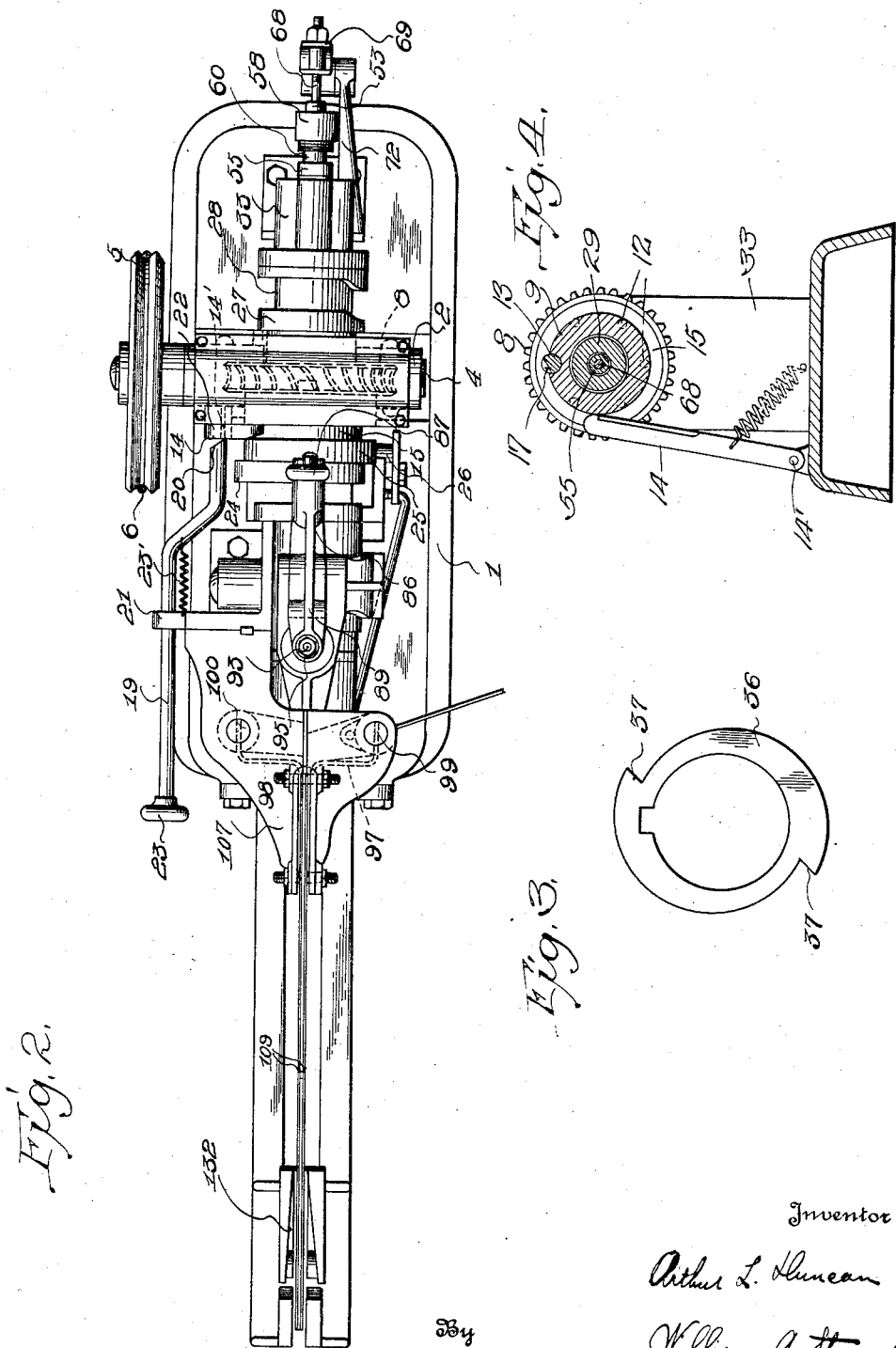

Patented Dec. 16, 1930

1,785,004

UNITED STATES PATENT OFFICE

ARTHUR L. DUNCAN, OF PIEDMONT, CALIFORNIA, ASSIGNOR, BY MESNE ASSIGNMENTS, TO PACIFIC MACHINERY COMPANY, OF SAN FRANCISCO, CALIFORNIA, A CORPORATION OF CALIFORNIA

FRUIT PITTING AND CORING APPARATUS

Application filed November 1, 1926, Serial No. 145,530. Renewed May 20, 1930.

This invention relates to a fruit halving and coring machine, especially adapted for the halving and pitting of peaches though it is capable of use in coring fruit of other kinds, and comprises an improvement of the apparatus disclosed in my copending application Serial No. 130,442, filed August 20, 1926.

The primary object of the invention is to provide novel adjustable pitting knives which are opened to allow passage between their ends of a fruit pit, and are closed to encompass the whole pit, preferably closely embracing the pit in the plane of its suture to adjust the knives to the varying diametered pits at their suture.

Another object of the invention is to provide pitting and coring apparatus with severing knives that are automatically adjusted to the size of the core to be removed, and then cut the core from the fruit in which frictional adjustments are utilized and and spring pressure on the knives during the cutting operation is eliminated.

Still another object of the invention is to provide novel drive arrangements for pitting and coring knives whereby knife breakages due to unusual obstructions are minimized or avoided.

Further objects of the invention are defined by the scope of the appended claims and will appear as the description of the invention proceeds with reference to the accompanying drawings in which, Figure 1 is a side elevation partially in section and with parts slightly distorted, showing the application of a preferred form of my invention to the pitting apparatus shown in my above mentioned application.

Figure 2 is a plan view of the form of invention shown.

Figure 3 is a detail view of the knife shaft actuating ratchet.

Figure 4 is a sectional end view illustrating one form of throw-out clutch embodied in this invention.

Only so much of the apparatus with my hereinafter disclosed improvements will be described as is necessary to a full understanding thereof as applied to the apparatus shown in said copending application to which reference may be had for a full understanding of the mechanisms not fully described.

On a suitable base 1 is secured casting 2 provided with a gear casing 3 and with suitable bearings for the shaft 4. Shaft 4 has secured to it a pulley 5 which may be driven from any suitable source of power. Preferably pulley 5 is grooved to receive a round belt 6 which is tensioned sufficiently, for example by an idler pulley (not shown) to normally drive the coring knives through the fruit to be cored, but is sufficiently loose to permit the belt to slip, preventing breakages of the knives when an unusual obstruction is encountered by the knives in this manner preventing knife breakages.

Keyed to shaft 4 in casing 3 is a worm 7 meshing with a worm wheel 8 rotatably mounted on a sleeve 9, a bushing 10 being arranged between the worm wheel and sleeve. A hardened clutch ring 11 is rigidly secured in a recess in wheel 8 and is provided with a series, preferably six, of annularly arranged holes 12. A clutch pin 13 is slidably supported in a suitable recess formed in sleeve 9 and is urged to the right by a helical spring 13'. Pin 13 is controlled by a pivoted lever 14 pivoted at 14' to the frame and provided with a wedge-shaped end that rides in groove 15 on an enlarged portion of sleeve 9 and serves to intermittently couple sleeve 9 and worm wheel 8 together for a single revolution of the worm wheel. Pin 13 is provided with an actuating groove 17, having an inclined side wall which is adapted to engage the inner beveled end of lever 14.

In operation, as sleeve 9 rotates, the beveled end of lever 14 engages the inclined side wall of groove 17 camming the pin 13 to the left in Figure 1. This movement of the pin 13 disengages the reduced end 18 thereof from a hole 12 of the clutch disk 11, breaking the driving connection between sleeve 9 and wheel 8. An actuating rod 19, provided with an inclined nose 20 is slidably supported and guided in brackets 21 and 22 of the supporting frame work and is provided with a handle 23 in a position to be conveniently engaged by the operator when a peach or fruit is in a position to be cored. A spring 23' normally holds rod 19 to the left in Figure 2. When rod 19 is pressed to the right in Figure 2, nose 20 engages an inclined surface formed on the outer end of lever 14 forcing the inner end of lever 14 out of groove 15. This movement of the lever 14 disengages the beveled end thereof from the inclined side wall 17 of the pin 13 and permits the pin 13 to move to the right in Figure 1 under influence of its spring 13'. As a hole 12 of clutch ring 11 comes into alignment with the reduced end 18 of pin 13, the end 18 nests in the hole 12 establishing a driving connection between worm wheel 8 and the sleeve 9. When rod 19 is released it moves to the position shown in Figure 2 releasing the lever 14 which moves inward to the position shown, again positioning the beveled end thereof to engage the inclined side wall of groove 17 and breaking the driving connection between worm wheel 8 and sleeve 9. In this way it will be seen that by shifting the rod 19 to the right in Figure 2 and immediately releasing it, a driving connection will be etstablished between sleeve 9 and wheel 8 for one revolution of the sleeve only and at the end of a complete revolution the driving connection will be broken and the sleeve 9 comes to rest. If desired, any other well known form of single revolution clutch may be substituted for that just described. For example, a constantly engaged friction clutch may be interposed between the wheel 8 and the sleeve 9 and sleeve 9 may be provided with a suitable stop projection adapted to engage a movable stop member controlled by rod 19. Such clutches are well known and the application thereof in the present device will be obvious to one skilled in the art.

Sleeve 9 has formed upon its enlarged portion, cams 24 and 25 and secured to cam 25 is a projecting pin 26. Keyed to reduced portion of sleeve 9 is a barrel cam 27 having a cam groove 28 cut therein, and arranged within sleeve 9 is the hollow main shaft 29. Shaft 29 is preferably enlarged in diameter as shown at 30 and has formed integrally therewith the knife supporting head 31. Shaft 29 is supported in bushed main bearings 32 and 33 provided in castings 34 and 35 which are secured to and supported from base 1.

Keyed to and driving main shaft 29 is a ratchet wheel 36 with two diametrically opposite teeth 37 (Figures 1 and 3). Teeth 37 are engaged by a pawl 38 pivoted on pin 39 carried by cam 24 of sleeve 9. Pawl 38 is provided with a projecting lug 40 (Figure 1) overhanging the edge of a stationary cam 41, designed to throw the pawl out of engagement with ratchet 36 after the completion of a half revolution by the main shaft 29.

Knife carrying head 31 (Figure 1) of shaft 29 is provided with spaced extensions 42 between the inner surfaces of which knife holders 43 are pivotally supported on pins 44 and guided for movement. Detachably secured in suitable recesses formed in knife holders 43 by means of set screws 45 are the curved pitting or coring knives 46. The knives are provided with cutting edges beveled outwardly and the arrangement is such that other smaller or larger knives may readily be substituted to meet the requirements of the particular size of fruit being operated upon.

Pitting knives 46 are swung toward and from each other on pins 44 by a slidable control member 47 provided with rack teeth 48 that mesh with gear segments 49. Gear segments 49 are formed integrally on knife holders 43 with the axes of pins 44 as centers for the gear so that sliding movements of control member 47 open and close the knives. Adjustable stop screws 50 are provided to limit and vary the extent of opening of knives 46.

Member 47 is slidably supported in a bore formed in head 31 and is provided with a slot 52 which guides gauge operating pin 51 as will more fully hereinafter appear. Threaded in the end of member 47 disposed in head 31 is the end of a hollow control rod 53 which is locked to member 47 by the nut 54. Rod 53 passes through the main shaft 29 and the outer end thereof fits slidably in a sleeve 55 which in turn fits slidably into and is guided by a bore 56 formed in the end of shaft 29. Threaded on the outer end 57 of sleeve 55 is a friction gland member 58 in which a friction packing 59 is disposed. By adjusting cap 58 on threaded section 57 of sleeve 55 it will be seen that the sliding friction between sleeve 55 and rod 53 may be varied. Sleeve 55 is provided with a groove 60, the walls of which are engaged by the forked end of a member 61 secured to the end of a cam rod 62. Threaded to the opposite end of rod 62 is a head 63 to which is secured cam roller 64 riding in cam groove 28 before referred to. A tubular guide member 65 having a bifurcated guide end 66 serves to guide cam rod 62 in its movement.

Pin 51 is attached to the flattened end of rod 68 and extends through slot 52 to actuate gauge plates 67, which are slidably arranged in grooves in head 31 and are loosely mounted on pin 51. The gauge plates 67 are arranged on opposite sides of knife holders 43 and the ends thereof are turned inwardly slightly providing an abutment for the pit of the peach when it is fed into the machine. Rod 68 passes through the hollow control rod 53 as shown in Figure 1 and has a grooved collar 69 secured to the end thereof. The forked end of a lever 70 fulcrumed at 71 to a bracket 72 secured to the casting 35 engages collar 69. A link 73 pivoted to an extension 74 of member 61 by means of pin 75 and to arm 70 by means of the securing pin 76 arranged in slot 77 from cam rod 62 to said gauge 67.

Secured to casting 34 (Figure 1) to swing about pivots 78 and 79 are jaw control levers 80 and 81. Attached to levers 80 and 81 in any suitable way that will permit ready change to other sizes, are jaws 82 and 83 which are recessed to fit around the pitting knives 46. Control levers 80 and 81 are provided with extensions 84 and 85 extending at right angles to the levers and toward each other and provided with inter-engaging teeth (broken away) that cause the levers to move in unison, as shown in said copending application. The control levers are yieldingly operated by a lever 86 provided with a roller 87 engaging cam 24 before referred to. Lever 86 swings about pivot 78 and has an arm 89 extending above a recess 90 in lever 81. Arranged in said recess is a compression spring 91 that is compressed by a disc 92 threaded on a pin 93 threaded in arm 89, thus transmitting a yielding force through spring 92 so that the jaws may yield when occasion demands. A member 94 secured in lever 81 and extending through a central opening in pin 93 is provided with the nuts 95 threaded on the upper end thereof. The lower nut 95 is adapted to abut against the upper end of pin 93 during clockwise movement of arms 81 and 86. The spring 91 disposed in recess 90 maintains the jaws 82 and 83 normally open and holds the roller in contact with cam 24.

The halves of the peach are caused to separate by wings 97 and 98 arranged preferably on opposite sides of the upper jaw 83 as shown in Figure 2. These wings swing on vertical axes to throw the pulp halves outward. The ends of wings 97 and 98 are turned toward each other to permit their ready entry in the cut in the peach by means presently to be described. The wings 97 and 98 are secured to posts 99 and 100 that are journaled in the frame of the machine in any suitable manner and are operated by the mechanism more fully set forth in said copending application to which reference may be had for a full understanding. In addition to the wings for throwing out the pulp halves shown, a device for kicking the pit or core out from between the knives 46 may be provided in the manner disclosed in my copending application.

In order to hold the main shaft 29 and the parts carried thereby in position at the completion of one cycle of operation, until the beginning of the next cycle, a locating collar 101 (Figure 1) is keyed to main shaft 29 adjacent casting 35. Collar 101 is provided with diametrically opposed conical notches 102 in position to be engaged by the V-shaped end of latch 103 disposed in a bore 104 formed in the casting 35. A helical spring 105 between an adjustable plug 133 and latch 103 urges the latch outwardly to engage the notches in the locating collar 101. The fruit to be cored is guided into position between the jaws and pitting knives by means that form a circumferential recess in the peach in the plane of the suture of the pit for the purpose fully pointed out in my Reissue Patent No. 16,259 dated February 9, 1926. This means comprises feed blade brackets 107 and 108 secured to the frame of the machine in any suitable manner. For pitting high grade fruit upper feed blade is preferably composed of two blades 109 separated slightly from each other but secured together to move as a unit. Blades 109 are cut away as shown at 110 to provide room for wings 97 and 98 and is provided with cutting edges 111 and 112 preferably at right angles to each other, the edges of which are inclined outwardly away from the space between the blades causing the pulp of the fruit to be slightly wedged apart as the circumferential groove is formed. Blade 109 is mounted to swing vertically on parallel links 113 and 114 pivoted to the bracket 107 at one end and to the blade at the other. A spring 115 keeps the blade yieldingly in position. The lower blade 116 is likewise preferably composed of two spaced blades secured together to move as a unit for pitting high grade fruit and it too has cutting edges 111 and 112 parallel to the cutting edges of the upper blade. Blade 116 continues beneath the lower pitting knife 46 and is arranged so that knife 46 and jaw 82 retreat between the spaced blades when the machine is in position to receive a peach for pitting. Blade 116 swings on a horizontal line on parallel links 117 and 118 pivoted at their lower ends to the bracket 108 and at their upper ends to the blade. A coil spring 119 interposed between suitable projections of the bracket and the blade yieldingly maintains said blade in position. In case it is desired to eliminate the yielding action of the blades 109 and 116 suitable holes 120 may be formed in the supporting brackets and blades 109 and 116 through which securing pins may be passed to hold the blades rigidly in the desired relation. In this way a relative adjustment of the blades in fixed positions to vary the size of the pit passageway is permitted.

Gouges 121, 122, 123 and 124 are arranged between the sets of blades to transversely cut and remove the narrow strip of the peach that enters between the blades of each set. Openings 125 in the blades adjacent said gouges permit the discharge of the portions of the annular strip removed during the feeding operation. Preferably the openings are cut in one blade only of the upper set and one blade only of the lower set so as not to provide a ledge upon which the strips can collect. When handling lower grades of fruit the blades may be made solid and the groove in the pulp formed solely by a wedging action in obvious manner without removing a slice, while suitable extensions of the lower blade may be provided between which jaw 82 retreats.

A tip remover is provided adjacent the path of the peach between blades 109 and 116 which includes a frame 126 pivoted to blade 116 at 128. A spring 129 between frame 126 and a stop on bracket 108 urges the frame forwardly against the end wall of an opening 130 in which frame 126 rides. The upper end 131 of frame 126 is curved rearwardly and is provided with a deep V-shaped cut 132 from its upper edge. A tip removing blade 133 is secured to frame 126 in position to cut off the tip of each peach, the curved upper end of the frame and the V-shaped cut therein serving to bring the blade 133 into effective operation on peaches of widely varying sizes, the range of movement of the frame in opening 130 being sufficient for this purpose.

*Operation*

In operation on peaches, the pitting knives 46 and jaws 82 and 83 are normally open and gauge 67 is in its forward position. A peach to be pitted is inserted in the channel between the blades 109 and 116 with the tip toward the operator as shown in Figure 1, and with the plane of the suture of the pit of the peach indicated by a crease on the outside of the fruit, substantially in the vertical central plane of blades. The operator then forces the peach downwardly between said blades removing the tip and cutting vertical kerfs in the ends of the peach in the plane of the suture of the pit. If the pit is larger than the space between the blades 109 and 116, blade 116 yields swinging in a horizontal plane on links 117 and 118 against the action of spring 119.

The operator moves the peach to the end of the vertical branch of the path between blades 109 and 116, and then moves it bodily in a horizontal direction between the blades until the stem end of the pit engages gauge 67. At this point in the operation a circumferential channel, recess, or groove has been formed around the peach in the plane of the suture of the pit and the halves are slightly wedged apart when they are moved over the wings 97 and 98 and over the extensions of blade 116 and the peach is in position for the cutting out of the pit.

The handle 23 of clutch control rod 19 is in position to be engaged by the hand of the operator as he or she completes the movement of the peach in the horizontal direction, and as the movement of the peach is completed the clutch rod is thrown forwardly thus setting in operation the sleeve 9 and the parts carried thereby. The pawl 38 is not in engagement with one of the teeth 37 on ratchet 36 keyed to the main shaft 29, but is between the teeth. Accordingly, the main shaft 29 does not turn immediately, but the sleeve 9 rotates through part of a revolution before the main shaft is brought into operation and rotates cam 27, shifting arm 62 and sleeve 55 to the right to the position of parts shown in Figure 1. As sleeve 55 is shifted to the right the friction between the packing 59 in gland 58 drags rod 53 and control member 47 to the right causing rack teeth 48 to rotate knife holder 43 to close knives 46 about the suture of the peach pit. When knives 46 are closed about the suture of the pit, motion of rod 53 will be arrested and sleeve 55 will then slide on the rod to the end of its movement. Movement of arm 62 acting through gauge control rod 68 causes the withdrawal of the gauge 67 so that when the knives are rotated, the end of the gauge will not mutilate the edges of the fruit halves. At the same time that the operations just described are taking place, cam 24 on sleeve 9 causes the jaws 82 and 83 to follow the knives 46 into the circumferential groove of the fruit and force the pitting knives 46 firmly against the suture of the pit. In this way the jaws and knives automatically adjust themselves to accommodate varying diameters of pits and at the same time center the fruit pit within the compass of the knives 46. When the jaws are closed they serve to support the flesh of the peach immediately adjacent the line of the cut, so that clean edges are produced.

After the completion of the above operations, pawl 38 on sleeve 9 engages one of the teeth on ratchet 36, resulting in the rotation of the main shaft 29 and pitting knife carrier 43 with knives 46 through half a revolution. Knives 46 accordingly cut the halves of the peaches from a central core including the whole pit just before a half revolution is completed and without crossing the plane of the suture of the pit starting the cutting operation. After the completion of a half revolution, the lug 40 of pawl 38 engages an enlargement on stationary cam 41 thus serving to disconnect shaft 29 from rotating sleeve 9. At the same time latch 103 engages a notch 102 on locating collar 101 of shaft 29, serving to hold shaft 29 in position for the next operation. Continued rotation of sleeve 9 causes cam 25 to actuate wings 97 and 98 ejecting the pulp halves in opposite directions and the pit kicker when used, is actuated to advance and dislodge the pit. Wings 97 and 98 and the pit kicker then return to their original position, jaws 82 and 83 are opened by cam 24, and sleeve 55 is shifted to the left in Figure 1, actuating rod 53 to open knives 46.

In case the pitting knives 46 encounter an obstacle such as an unusually large pit, the belt 6 will slip on wheel 5, thus avoiding breaking of the knives. In such a case the machine is cleared of the peach if necessary. After the machine is cleared, the belt 6 will drive the mechanism until the revolution of the clutch is completed when pin 13 will be shifted and sleeve 9 will automatically come to rest in proper relative position with respect to the guides. Instead of permitting belt 6 to slip, a slip clutch may be interposed between pulley 5 and shaft 4 or the clutch driving sleeve 9 may be replaced by an ordinary friction clutch that will slip when knives 46 encounter an unusual obstruction. When a friction clutch is used to drive sleeve 9, a stop projection is provided on sleeve 9 that abuts against a stop controlled by rod 19 to permit a single revolution at a time of sleeve 9, as above set forth.

While the invention has been above described in great detail, it should be understood that it is not restricted to such details which may be varied widely without departing from the spirit of the invention, and that the scope thereof is to be determined from the terms of the following claims.

Having described preferred embodiments only of the invention, what is desired to be secured by Letters Patent and is claimed as new is:

1. In a fruit pitting and coring device, a plurality of curved blades, and frictionally operated means to open and close said blades.

2. In a peach pitting machine, a pair of blades curved to the approximate form of half of the pit to be removed in the plane of its suture; frictional means for opening said blades to receive the pit to be removed and to adjustably close the blades about the pit in the plane of its suture; and means to simultaneously revolve said blades to cut a central core from the peach abutting the substantially intact pit.

3. The combination as set forth in claim 2, together with means for yieldingly pressing said blades firmly about the pit in the plane of its suture.

4. A peach pitter including peach pitting knives; frictional means to adjustably position the peach pitting knives to remove the pit from the peach; means to hold the peach in position for the operation of said knives; and means to rotate said knives to cut the pit from the peach.

5. A fruit coring device for use in removing a central core from fruit in which a circumferential recess to the depth of the core to be removed has been formed, including frictionally operated means to enter said recess and cut out a central core from the fruit.

6. The combination as set forth in claim 5, together with means for entering said recess and yieldingly pressing said first mentioned means about the core to be removed.

7. In a peach pitting and coring machine, a pair of knives each curved to a shape corresponding to approximately half of the core to be removed; means to separate the knives to permit positioning of a core to be removed from the fruit between them; frictionally operated means for closing the knives about the core to be removed; and adjustable stop means for predetermining the extent of opening of said knives to accommodate different size cores.

8. The combination as set forth in claim 7 together with means operating in timed relation to said knives for yieldingly pressing them into closed position about the central core to be removed.

9. Pitting apparatus for single stone fruits comprising spaced blades providing a path for the stone of the fruit; means to cut the stone from the fruit arranged at the end of said path; means for driving said cutting means through the fruit only until an unusual obstruction is encountered by said cutting means; and mechanism to control the operation of said cutting means, said last named mechanism including control means arranged adjacent the end of said path in position to be engaged by the operator as a peach is brought to the end of said path.

10. Fruit pitting and coring apparatus, comprising means for rotation around the pit to cut it from the peach and separate the halves of the pulp therefrom; continuously operating driving means for said first named means arranged to slip when said first named means encounter an unusual obstruction; and manually controlled means for causing intermittent operation of said first named means.

11. A fruit pitting and coring device provided with a passage for a core to be removed; coring means positioned in alignment with said passage; and means for driving said coring means around said core initiated in operation under manual control to sever a central core from the fruit, and means to automatically arrest the operation after the central core has been cut free; said drive means being arranged to slip if an unusual obstruction is encountered by said coring means.

12. A peach pitter having blades spaced apart to form a channel for the passage of a pit to be removed from a peach and to cut the flesh of the peach from its outward diameter substantially to the depth of the outer diameter of the center pit to be removed; rotatable pitting means normally positioned in the plane of said channel; continuously operable power means for intermittently actuating said pitting means; and means for causing actuation of said pitting means by said power driving means to sever a central core including the whole pit from a peach to be pitted, and to restore the said pitting means to normal position in the plane of said channel.

13. A peach pitter having blades spaced apart to form a channel for the passage of a peach to be pitted; rotatable pitting means normally positioned in the plane of said channel; continuously operable power means for said pitting means arranged to slip when said rotatable pitting means strike an unusual obstruction; and means for causing actuation of said pitting means by said power driving means to sever a central core from a peach to be pitted, and to restore the same to normal position in the plane of said channel.

14. A peach pitter of the type that includes a pair of pitting knives each formed to follow the contour of a substantial portion of the pit of the peach, comprising means to move said knives toward each other to substantially surround the pit of the peach, said means including a friction clutch to yieldingly move the knives into contact with the pit of the peach, and means for rotating said knives about the pit.

15. A peach pitter of the type that includes a pair of pitting knives each formed to follow the contour of a substantial portion of the pit of the peach, comprising slidable means to cause said pitting knives to separate and close around the pit of the peach successively, mechanism to slide said means including a clutch member that frictionally engages said means whereby the knives may be brought yieldingly into contact with the pit, and means for rotating said knives about said pit.

16. A peach pitter comprising a pair of curved pitting knives each shaped to conform to a substantial portion of the outline of the pit of the peach, means for pivotally mounting said knives, slidable means to swing said knives upon their pivots to cause them to engage the pit, mechanism to actuate said slidable means including a positively driven element and a friction clutch connecting said element to said sliding means whereby said knives may be brought yieldingly into contact with the edge of the pit and means including a pair of elements held in frictional engagement for rotating said knives about the pit.

17. A peach pitter comprising a pair of curved pitting knives, a pair of jaws, said knives and jaws being movable toward and from each other, means to cause said knives to engage the pit of a peach, means to cause said jaws to engage said knives after they have been brought in contact with said pit, and means to cause said knives to rotate around said pit, said last named means including elements that are frictionally in engagement, whereby slipping between said elements will be permitted if the knives engage an obstruction.

18. A peach pitting machine comprising pitting means, holding jaws, and mechanism for rotating said pitting means, means including a friction clutch to move said pitting means into engagement with said pit, yielding means to move said holding means into operative position and means including a plurality of elements in frictional engagement for actuating said rotating means.

In testimony whereof I affix my signature.

ARTHUR L. DUNCAN.